(12) United States Patent
Sarmadi

(10) Patent No.: US 6,179,446 B1
(45) Date of Patent: Jan. 30, 2001

(54) ARC LAMP LIGHTSOURCE MODULE

(75) Inventor: Kamran Sarmadi, Cupertino, CA (US)

(73) Assignee: EG&G ILC Technology, Inc., Sunnyvale, CA (US)

(*) Notice: Under 35 U.S.C. 154(b), the term of this patent shall be extended for 0 days.

(21) Appl. No.: 09/275,666

(22) Filed: Mar. 24, 1999

(51) Int. Cl.$^7$ .................................................. F21K 27/00
(52) U.S. Cl. ......................... 362/264; 362/294; 362/295; 362/285; 362/373; 362/376; 362/378
(58) Field of Search ................................... 362/264, 294, 362/295, 285, 273, 373, 376, 378

(56) References Cited

U.S. PATENT DOCUMENTS

| | | | |
|---|---|---|---|
| 5,561,338 | * 10/1996 | Roberts et al. | 313/46 |
| 5,721,465 | * 2/1998 | Roberts | 313/46 |
| 5,855,488 | * 1/1999 | Heintz et al. | 439/310 |

* cited by examiner

Primary Examiner—Sandra O'Shea
Assistant Examiner—Ali Alavi

(74) Attorney, Agent, or Firm—Thomas E. Schatzel; Law Offices of Thomas E. Schatzel, A Prof. Corp.

(57) ABSTRACT

An arc lamp lightsource module comprises a removable lamp unit including an arc lamp attached to two radial electrode heatsinks that are in turn disposed in an insulating sleeve housing. A chassis has a catch and a clip to lock down the removable lamp unit. An igniter is included to power the arc lamp. A single fan and an air plenum are disposed in the chassis and provide for a cooling airflow that is split between the igniter and the two radial electrode heatsinks. A pair of machine screws provide electrical contact to each of the two radial electrode heatsinks and that have crowned heads for a smooth contact surface. A printed circuit board (PCB) has springboard cutouts and electrical pads providing for a spring-pressure electrical contact between the igniter and the arc lamp through the pair of machine screws. An electrical interlock switch is mounted to a corresponding springboard cutout on the PCB and provides for an interruption of electrical power from the igniter when the removable lamp unit is removed from the chassis. A pair of fulcrum knobs are provided on one side of the removable lamp unit and provide for a rolling action of the housing to assist a user in removing the removable lamp unit from the chassis.

8 Claims, 5 Drawing Sheets

ARC LAMP LIGHTSOURCE MODULE

BACKGROUND OF THE INVENTION

1. Field of the Invention

The invention relates generally to arc lamps and specifically to arc lamp assemblies that fit standard module dimensions.

2. Description of the Prior Art

The high power xenon arc lamp market has been pressing lamp manufacturers with two diametrically opposed goals, compactness and high power. Several manufacturers make a standard lamp holder and module assembly that has found wide acceptance. Newer higher powered lamps must fit the constraints of such standardized modules if they are to have any chance of commercial success.

SUMMARY OF THE PRESENT INVENTION

It is therefore an object of the present invention to provide a xenon arc lamp module.

It is another object of the present invention to provide a xenon arc lamp module that is compact and efficient.

It is a further object of the present invention to provide a xenon arc lamp module with a removable lamp assembly that quickly and easily registers and locks within the main unit.

Briefly, an arc lamp module embodiment of the present invention comprises a removable lamp unit including a xenon arc lamp attached to two radial electrode heatsinks that are in turn disposed in an insulating sleeve housing. A chassis has a catch and a clip to lock down the removable lamp unit. An igniter is included to power the arc lamp. A single fan and an air plenum are disposed in the chassis and provide for a cooling airflow that is split between the igniter and the two radial electrode heatsinks. A pair of machine screws provide electrical contact to each of the two radial electrode heatsinks and have crowned heads for a smooth contact surface. A printed circuit board (PCB) has springboard cutouts and electrical pads providing for a spring-pressure electrical contact between the igniter and the arc lamp through the pair of machine screws. An electrical interlock switch is mounted to a corresponding springboard cutout on the PCB and provides for an interruption of electrical power from the igniter when the removable lamp unit is removed from the chassis. A pair of fulcrum knobs are provided on one side of the removable lamp unit and provide for a rolling action of the housing to assist a user in removing the removable lamp unit from the chassis.

An advantage of the present invention is that an extended-power arc lamp is provided.

Another advantage of the present invention is that an arc lamp is provided that can operate at 500 watts and still fits into standard modular lamp assemblies.

It is a further advantage of the present invention that a 500 watt arc lamp is provided that operates approximately 150° C. cooler than comparable 300 watt arc lamps and has about twice the previous reflector area.

These and other objects and advantages of the present invention will no doubt become obvious to those of ordinary skill in the art after having read the following detailed description of the preferred embodiments which are illustrated in the drawing figures.

IN THE DRAWINGS

DETAILED DESCRIPTION OF THE PREFERRED EMBODIMENTS

Figure 1:
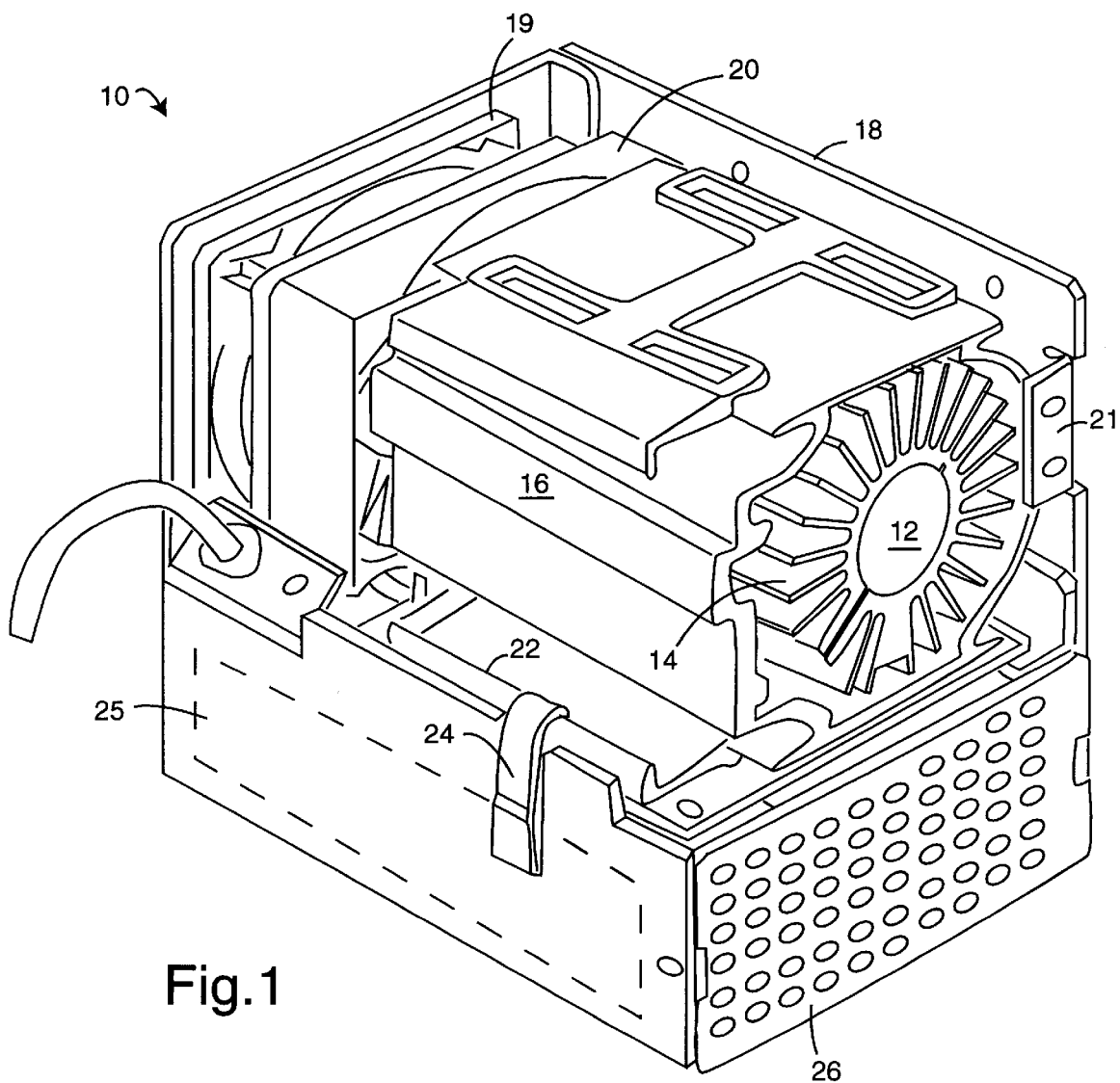
FIG. 1 is an isometric assembly view of a modular lamp assembly embodiment of the present invention.

FIG. 1 illustrates a modular lamp assembly embodiment of the present invention, referred to herein by the general reference numeral 10. The modular lamp assembly 10 comprises a xenon arc lamp 12, a pair of electrode heatsinks 14 (only a forward one of which is visible in FIG. 1), an epoxy-fiberglass housing 16 in which the heatsinks are sleeved, a combination heatspreader-chassis 18 to provide a foundation mounting for all other components, a fan 19 to provide forced-air cooling, and an air plenum 20 to direct cooling airflow to the spaces within the assembly. The xenon arc lamp 12 is preferably a 100–500 watt CERMAX brand-type marketed by ILC Technology (Sunnyvale, Calif.).

The combination heatspreader-chassis 18 is constructed from 0.125" thick aluminum plate. Steel is not as suitable because steel does not spread and dissipate the heat generated by electronic components as well as aluminum does. The chassis 18 further has a mounting tab 21 for securing an arm that can hold an optical filter, fiber holder and/or shutter closely in front of the lamp 12. Conventional lamp units place such optical filters in the next adjoining mechanical assembly.

A bottom lip 22 on the epoxy-fiberglass housing 16 allows a clip 24 to lock the housing to the chassis. An igniter 25 is behind a cover 26 that guards users against contact with the twenty-five to thirty kilovolts generated to power the lamp 12. The cover 26 is perforated with large apertures to provide for a cooling airflow from the fan to circulate past the igniter components. The cover 26 comprises a non-metallic materials so that its close proximity to the igniter does not degrade the electrical operation of the igniter. A material such as polycarbonate (LEXAN) is preferred.

The combination of the CEIMAX type xenon arc lamp 12, the pair of electrode heatsinks 14 (one of which is visible in FIG. 1), and the epoxy-fiberglass housing 16 is removable as a single lamp unit 27.

Figure 2:
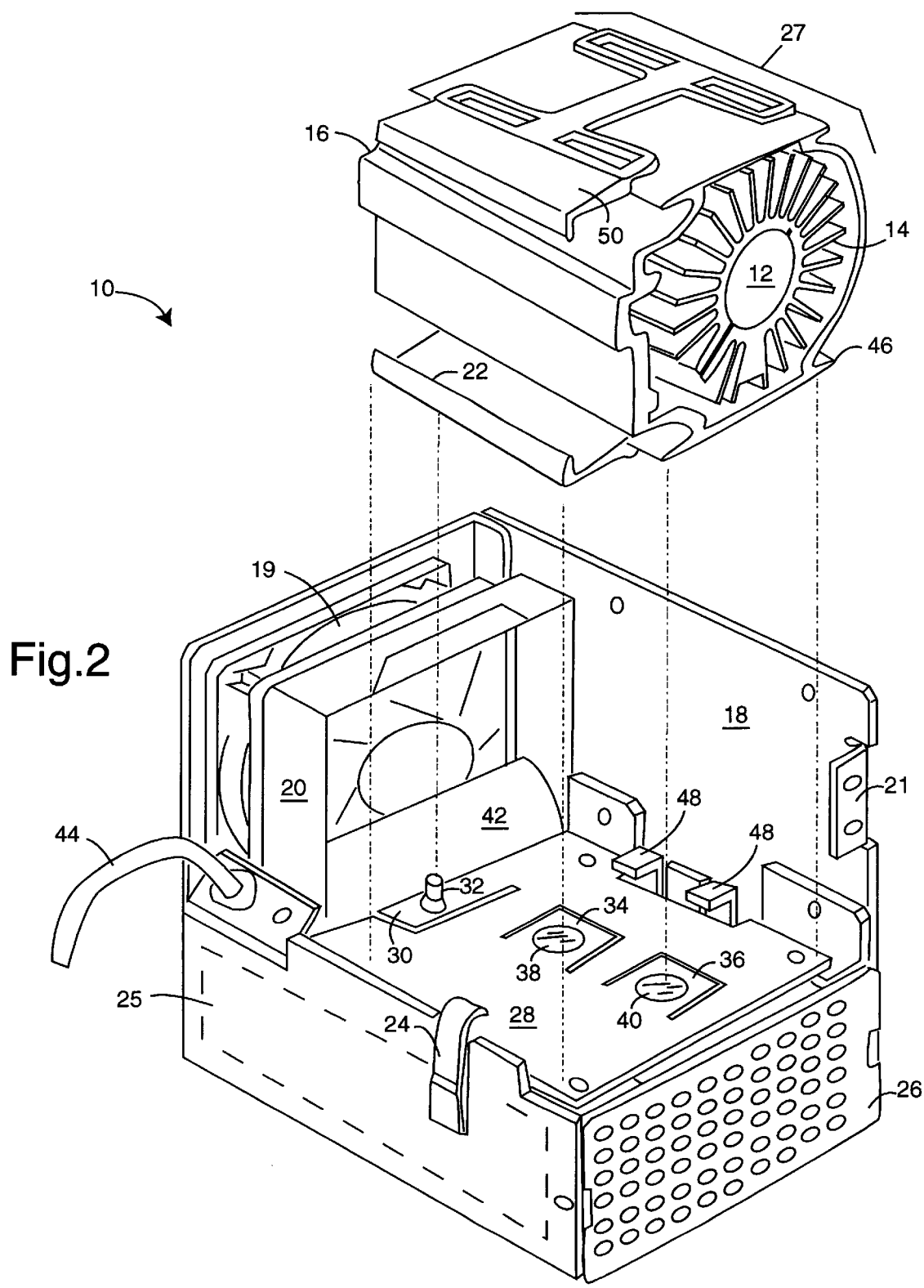
FIG. 2 is an exploded assembly view of the modular lamp assembly of FIG. 1 and shows the components that were hidden by the removable lamp unit suspended above.

FIG. 2 illustrates such whole lamp unit 27 removed from the chassis, igniter, and cooling system. A 0.0625" thick "G10" type glass-epoxy printed circuit board (PCB) 28 includes a springboard 30 with an interlock switch 32. When the lamp unit is removed as in FIG. 2, the interlock switch 32 disables the igniter and prevents the user from being exposed to lethal voltages. The PCB 28 further includes a pair of springboards 34 and 36 each with a corresponding lamp electrode contact 38 and 40. The springboards 30, 34, and 36 are simply three-sided cuts in the PCE 28 that allow the isolated pieces to flex when the lamp unit is installed and presses down against them. Such springboards allow for a much lower profile construction than would otherwise be possible with conventional methods. The fan plenum 20 includes a divider vane 42 that splits the airflow from the fan 19 into two. The second part of the airflow proceeds axially through the electrode heatsinks 14 and out above the cover 26. A conventional powercord 44 supplies 100–260 VAC utility power to the igniter. The fan 19 is operated on twelve volts DC provided by the igniter.

A lip 46 on the bottom back edge of the housing 16 is slipped into a catch 48 that cantilevers over the back edge of the PCB 28. The lip 46 and catch 48 on the back edge, and the lip 22 and clip 24 on the front edge, provide for a positive and secure lock of the lamp unit 27 to the chassis 18. Such means are so secure, in fact, that a special device is needed to help the user rotate the lamp unit 27 clockwise (in the perspective of FIG. 2) to release the back lip 46 out of the catch 48 using a finger-pull 50.

Figure 3:
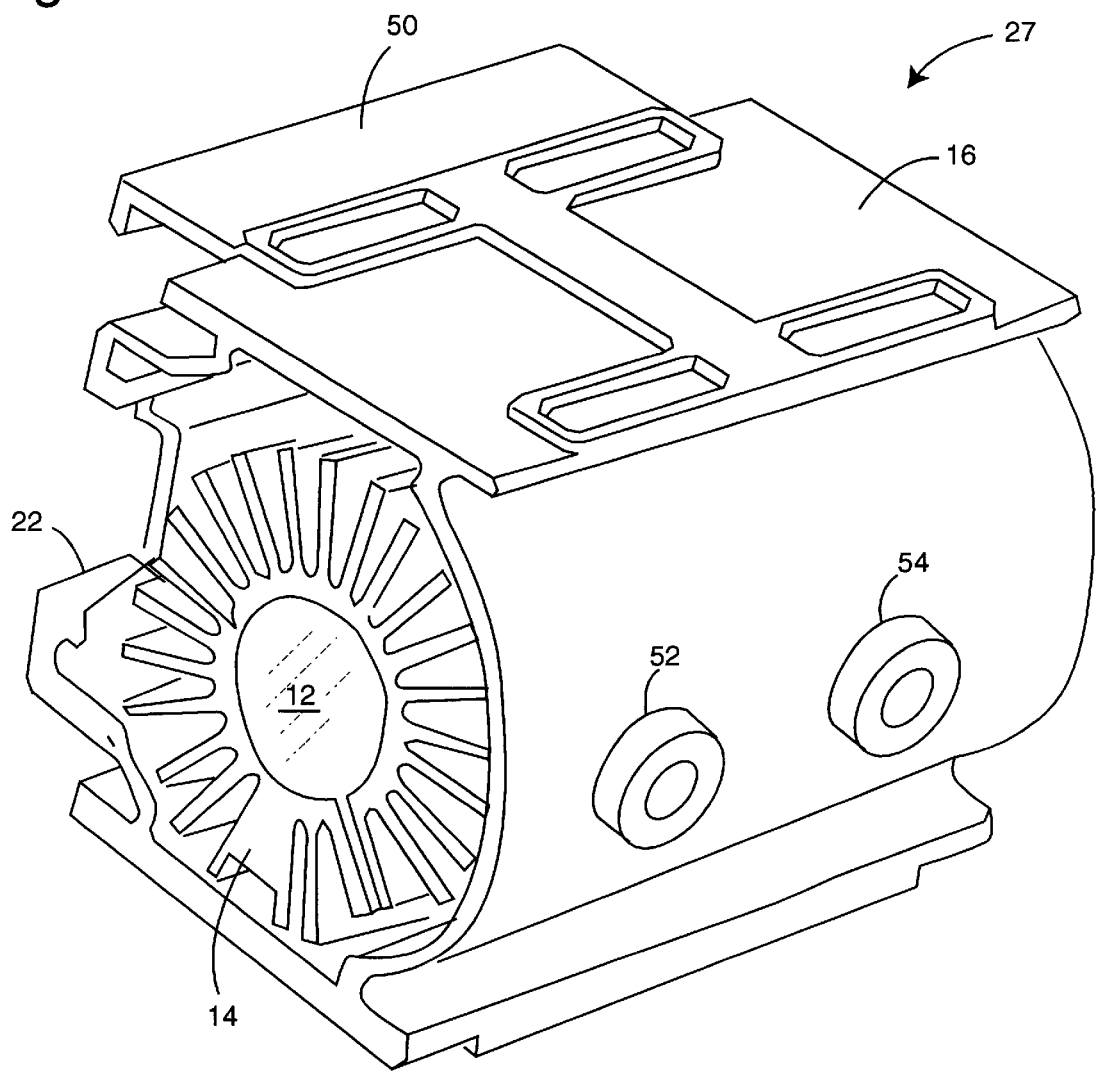
FIG. 3 is a perspective view of the backside of the removable arc lamp unit of FIGS. 1 and 2.

FIG. 3 illustrates such special devices assisting in roll of the lamp unit 27 after the clip 24 is released. A pair of knobs 52 and 54 act as fulcrums against the adjacent surface of the chassis 18 when the finger-pull 50 is lifted up and back by the user. Such knobs 52 and 54 are preferably molded-in features included in the fabrication of the housing 16.

Figure 4:
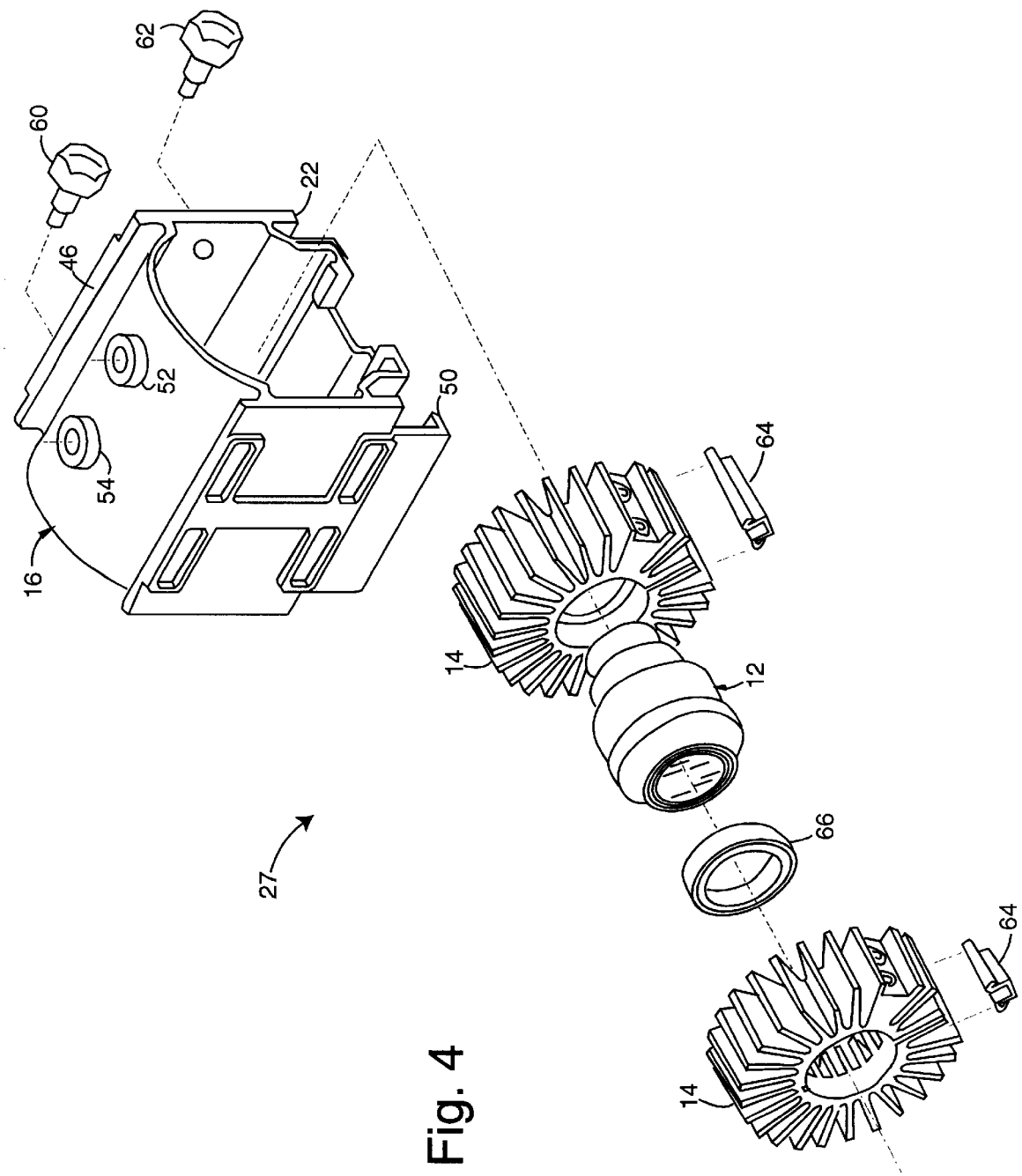
FIG. 4 is an exploded assembly view of the removable arc lamp unit of FIGS. 1–3.

FIG. 4 illustrates the components of lamp unit 27 that permit electrical connection of the two electrodes of arc lamp 12 to the contacts 38 and 40 on the PCB 28 (FIG. 2). A pair of machine screws 60 and 62 pass through the insulating material of housing 16 and screw into respective electrode heatsinks 14. The tops of the machine screws 60 and 62 are finished with a slight rounded crown so that the contact 38 and 40 (FIG. 2) rides smoothly as the springboards 34 and 36 flex under pressure. A pair of clips 64 are used to close the heatsinks in place around the cathode and anode electrical contact rings of the arc lamp 12. An optical filter 66 can be pressed into a space in the forward heatsink 14 in front of lamp 12, or it can be suspended in place by an arm attached to the mounting tab 21 on chassis 18 (FIG. 1 and 2). The lamp unit 27 is registered in its correct position by the combined constraining action of the catch 48, spring clip 24, the PCB 28, and the air plenum 20 (FIG. 2).

Figure 5:
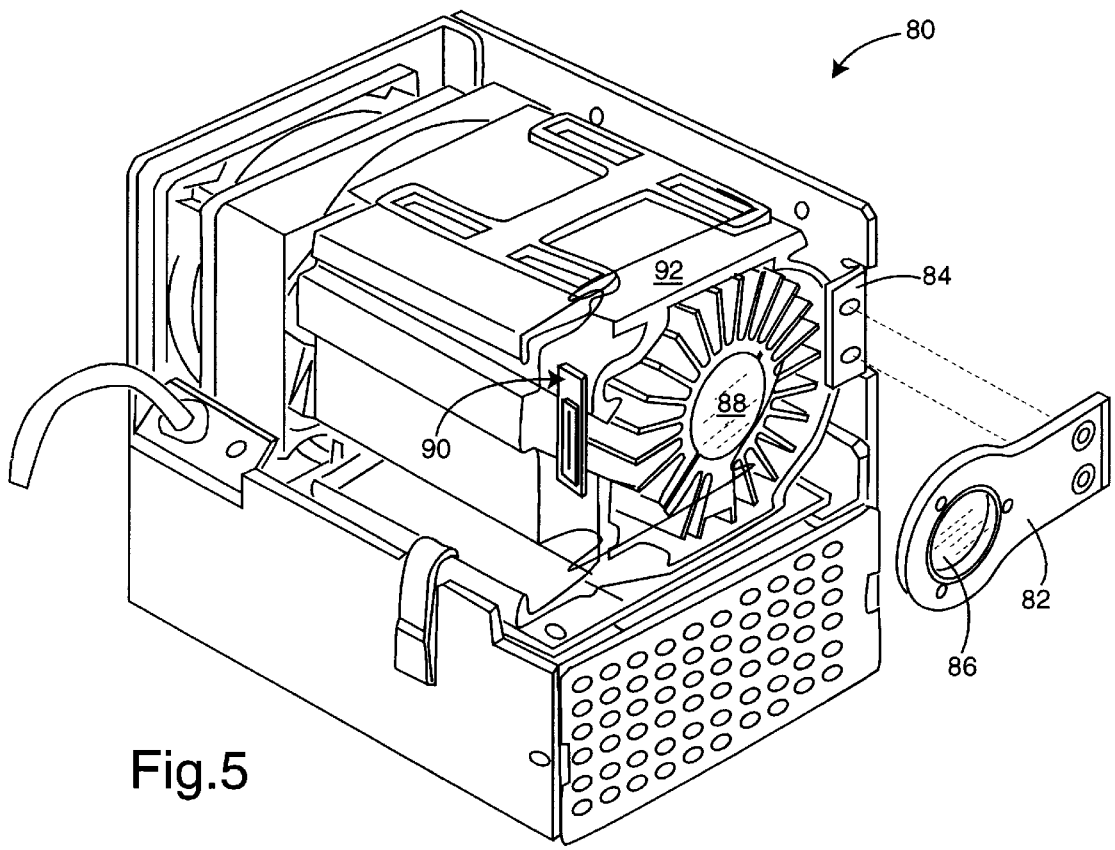
FIG. 5 is an exploded assembly view of a modular lamp assembly embodiment of the present invention that includes an optical piece suspended on a fixed monocle arm, such as a filter, fiber mount, shutter, and an hours-of-operation hour-meter.

FIG. 5 illustrates a modular CERMAX xenon lamp (CXL) assembly 80 in an alternative embodiment of the present invention. The CXL 80 is similar to the assembly 10 shown in FIGS. 1–4 except that a monocle arm 82 attaches to a mounting tab 84 so that an optical piece 86 is positioned close in front of an arc lamp 88. The optical piece 86 may be a neutral glass or a wavelength-selecting component such as a hot mirror, a fiber holder or a shutter assembly. The hours of operation of lamp 88 are tracked by an hour-meter 90 which includes a photovoltaic cell connected to drive a solid-state bar meter, such as a Curtis Instruments model 120-PC98-14P. The hour-meter 90 is attached directly to the outside housing 92. Enough stray light from lamp 88 is available at the position illustrated for hour-meter 90 that the photovoltaic cell will provide sufficient electrical power to operate the hour bar meter. A 500 or 1500-hour scale is typical for many applications.

Although the present invention has been described in terms of the presently preferred embodiments, it is to be understood that the disclosure is not to be interpreted as limiting. Various alterations and modifications will no doubt become apparent to those skilled in the art after having read the above disclosure. Accordingly, it is intended that the appended claims be interpreted as covering all alterations and modifications as fall within the true spirit and scope of the invention.

What is claimed is:

1. An arc lamp module, comprising:
   a removable lamp unit including an arc lamp attached to two radial electrode heatsinks that are in turn disposed in an insulating sleeve housing;
   a chassis including a catch and a clip providing for a secure locking down of the removable lamp unit;
   an aluminum plate formed to the chassis and providing for heatspreading; and
   an igniter disposed in a bottom part of the chassis under the removable lamp unit and for providing operating power to said arc lamp.

2. The arc lamp module of claim 1, further comprising:
   a single fan and an air plenum disposed in the chassis and providing for a cooling airflow that is split into a lower airflow for said igniter and an upper parallel airflow for passage through said two radial electrode heatsinks.

3. The arc lamp module of claim 1, further comprising:
   a pair of machine screws that provide electrical contact to each of said two radial electrode heatsinks and having crowned heads with a smooth contact surface; and
   a printed circuit board (PCB) with springboard cutouts and electrical pads providing for a spring-pressure electrical contact between said igniter and said arc lamp through the pair of machine screws.

4. The arc lamp module of claim 3, further comprising:
   an electrical interlock switch mounted to a corresponding springboard cutout on the PCB that provides for an interruption of electrical power from said igniter when the removable lamp unit is removed from the chassis.

5. The arc lamp module of claim 1, further comprising:
   a mounting tab disposed on the chassis and providing for the support of a monocle arm and an optical piece suspended directly in front of said arc lamp.

6. The arc lamp module of claim 1, further comprising:
   a non-conducting plate with apertures positioned to enclose a portion of the chassis and to cover said igniter without causing electrical interference to said igniter and providing for circulation of air about said igniter.

7. The arc lamp module of claim 1, further comprising:
   a pair of fulcrum knobs provided on one side of the removable lamp unit and positioned adjacent to the chassis to provide for a rolling action of said housing during removal of the lamp unit from the chassis.

8. An arc lamp module, comprising:
   a removable lamp unit including a CERMAX-type arc lamp attached to two radial electrode heatsinks that are in turn disposed in an insulating sleeve housing;
   a chassis including a catch and a clip providing for a secure locking down of the removable lamp unit, and further including an igniter to power said arc lamp;
   a single fan and an air plenum disposed in the chassis and providing for a cooling airflow that is split between said igniter and said two radial electrode heatsinks;
   a pair of machine screws that provide electrical contact to each of the two radial electrode heatsinks and having crowned heads with a smooth contact surface;
   a printed circuit board (PCB) with springboard cutouts and electrical pads providing for a spring-pressure electrical contact between said igniter and said arc lamp through the pair of machine screws;
   an electrical interlock switch mounted to a corresponding springboard cutout on the PCB that provides for an interruption of electrical power from said igniter when the removable lamp unit is removed from the chassis;
   a mounting tab disposed on the chassis and providing for the support of a monocle arm and an optical piece suspended directly in front of said arc lamp;
   a non-conducting plate with apertures positioned to enclose a portion of the chassis and cover said igniter without causing electrical interference to said igniter and providing for circulation of air about said igniter;
   an aluminum plate joined to the chassis and providing for heatspreading; and
   a pair of fulcrum knobs on one side of the removable lamp unit and positioned adjacent to the chassis to provide for a rolling action of said housing during removal of the removable lamp unit from the chassis.

* * * * *